W. F. FOLMER.
PHOTOGRAPHIC CAMERA.
APPLICATION FILED DEC. 14, 1916.
1,270,280.
Patented June 25, 1918.
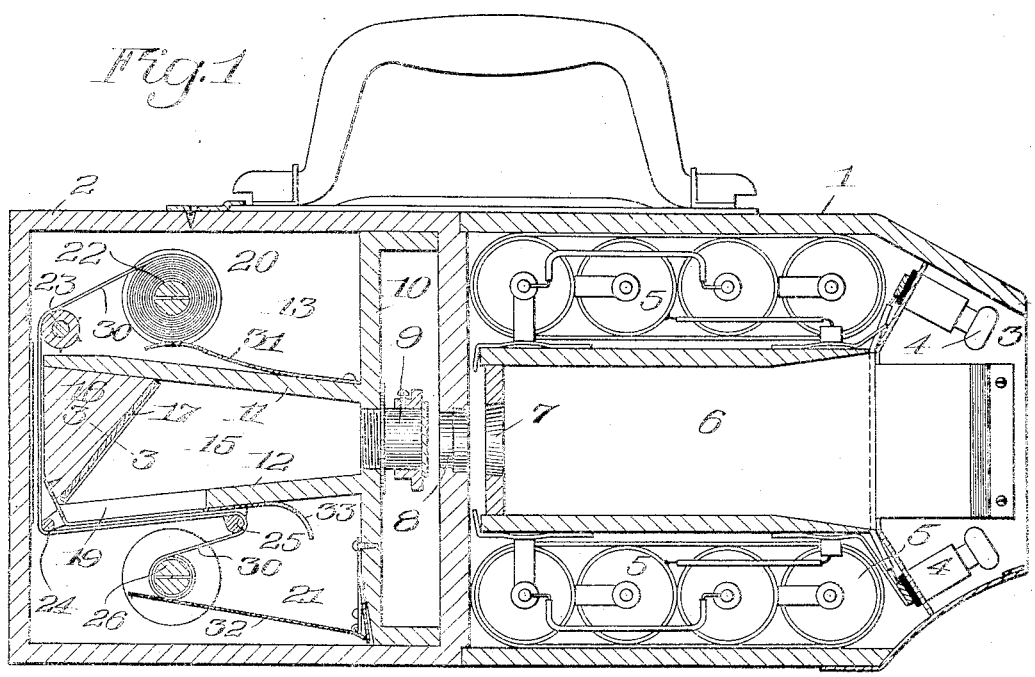
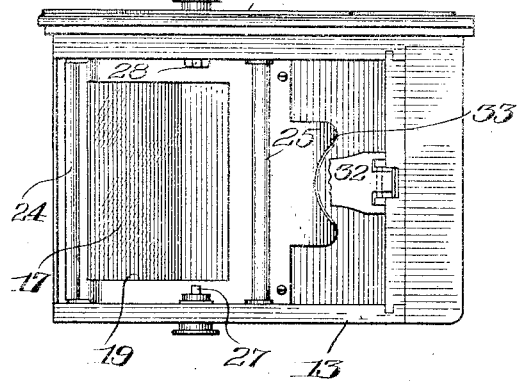
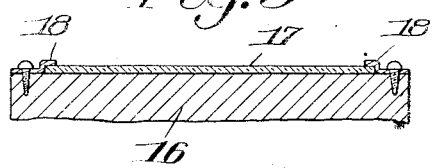
WITNESSES:
Nelson H. Copp
INVENTOR
William F. Folmer
BY
his ATTORNEYS

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

1,270,280.　　　　Specification of Letters Patent.　　Patented June 25, 1918.

Application filed December 14, 1916. Serial No. 136,893.

*To all whom it may concern:*

Be it known that I, WILLIAM F. FOLMER, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras of the kind in which the picture is not printed from a negative but is taken directly upon a film strip (usually sensitized paper) within the camera and the invention has for its object to provide a camera having simple and convenient means for reversing the image at the time of exposure, the reversing of the image being usually left to the printing operation in former methods. To these and other ends the invention resides in certain improvements and combinations of parts, all as will be hereinafter more fully described the novel features being pointed out in the claim at the end of the specification.

In the drawings:

Figure 1 is a central section through a camera constructed in accordance with and illustrating one embodiment of my invention;

Fig. 2 is a bottom plan view of the removable inner frame of the camera, and

Fig. 3 is a detail fragmentary enlarged section through the mirror taken substantially on the line 3—3 of Fig. 1.

Similar reference numerals throughout the several views indicate the same parts.

In the drawings, I have illustrated my improvements in connection with a special camera adapted to the special purpose of photographing gas meter readings and I will describe its general features very briefly. It is made of two outer casings 1 and 2 the former of which has an open front 3 that is held against the meter dial and the latter illuminated by electric lamps 4 supplied from batteries 5. A central chamber 6 in this forward casing 1 has an opening 7 at the rear in alinement with an opening 8 at the front of the rear casing 2. Back of this last mentioned opening 8 is the lens 9 carried on an inner frame 10 that is slidable laterally into and out of the rear casing 2. This frame and the parts carried thereby are shown detached in Fig. 2. At the rear the frame 10 carries two diverging walls 11 and 12 which, in conjunction with a side wall 13 and an outer side wall 14 (Fig. 2) form an exposure chamber 15 in rear of the lens 9. At the back of this exposure chamber is a block 16 forming a bed for a mirror 17 inclined at an angle of 45° to the axis of the lens. The mirror is fixed against the block in any suitable manner as by the clips 18 shown in Fig. 3. Directly beneath it is an exposure opening 19 in the wall 12 of the exposure chamber.

The walls 11, 12, 13 and 14, in conjunction with the top and bottom and rear walls of the rear casing 2, also form film feeding and winding chambers 20 and 21, respectively. A film spool 22 in the feed chamber 20 is journaled in the usual manner between the walls 13 and 14 as are two guide rollers 23 and 24 (the former being also a measuring roll in the present instance), an idler 25 and a winding spool 26, the latter located in the winding chamber 21. The idle center 27 and the winding center 28 for the spool 26 turned by the knob 29 are shown in Fig. 2.

The film strip 30 is led from the supply spool 22 over the guides 23 and 24 in rear of the mirror 17. The film is always wound with the sensitive side innermost on the spool and from the guide roller 24; the strip is therefore led forwardly to the idler 25 so as to dispose this sensitive side beneath and closely against the exposure opening 19 where the image reflected from the mirror 17 can be cast thereon. It is thence run rearwardly again and taken up on the winding roll 26 with the exposed side innermost.

31 and 32 are spring tensioning devices engaging the respective rolls of film.

To assist in threading the film strip onto the winding spool 26, a curved deflector plate 33 is provided just forwardly of the idler 25. When the end of the strip is thrust between the idler and the wall 12, it is turned back into the chamber 21 where it can be readily grasped and pulled back for attachment to the spool 26.

The described construction is compact and gives the desired reversal of the recorded image in a simple and accurate manner.

I claim as my invention:

In a photographic camera, the combination with a lens, an exposure chamber, a film feeding chamber on one side of the exposure chamber and a film winding chamber on the other side thereof, the exposure and film winding chambers having a communicating opening, of a mirror at the back of the exposure chamber arranged to direct light from the lens through the said opening, devices for feeding film from one film chamber to the other in rear of the mirror and means for supporting the film with its sensitive side toward the opening.

WILLIAM F. FOLMER.

Witnesses:
RUSSELL B. GRIFFITH,
AGNES NESBITT BISSELL.